W. GRIES.
DEMOUNTABLE RIM.
APPLICATION FILED NOV. 24, 1917.

1,261,120.

Patented Apr. 2, 1918.
2 SHEETS—SHEET 1.

Inventor
WILLIAM GRIES
By
Attorney

W. GRIES.
DEMOUNTABLE RIM.
APPLICATION FILED NOV. 24, 1917.
1,261,120.
Patented Apr. 2, 1918.
2 SHEETS—SHEET 2.
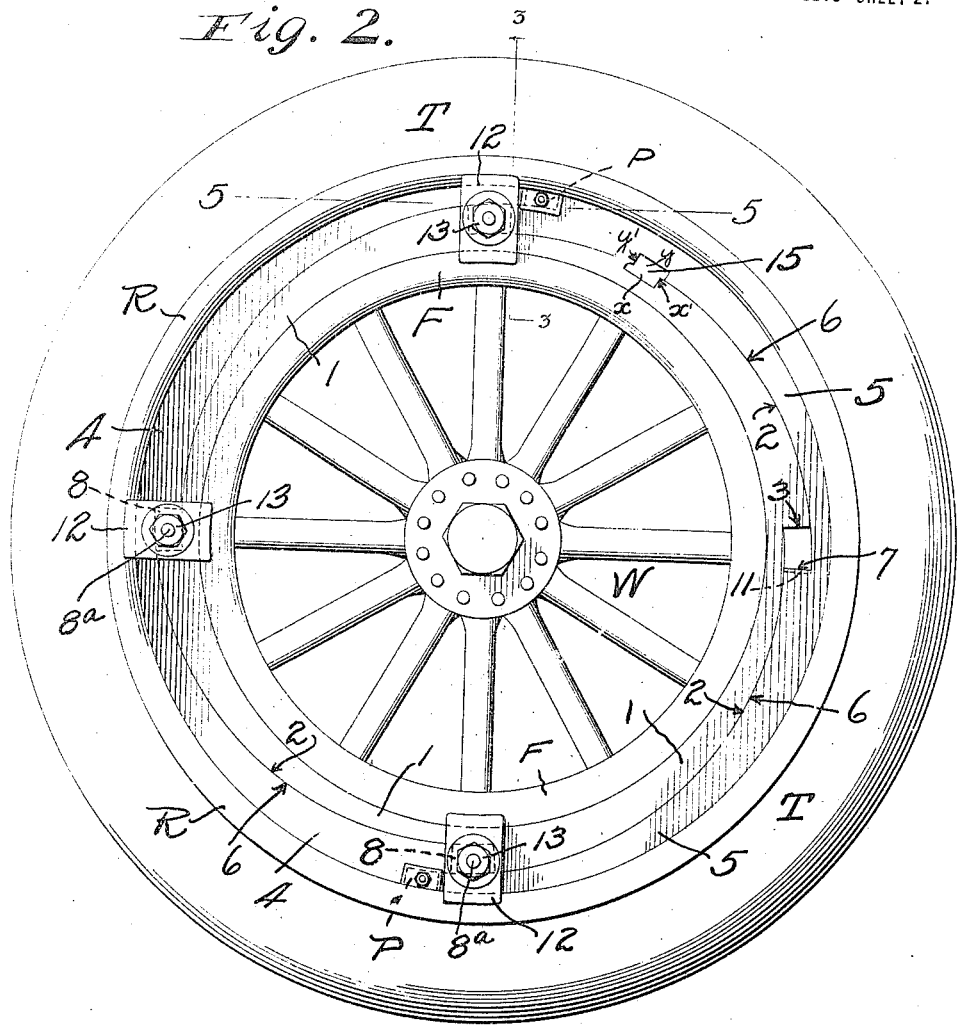
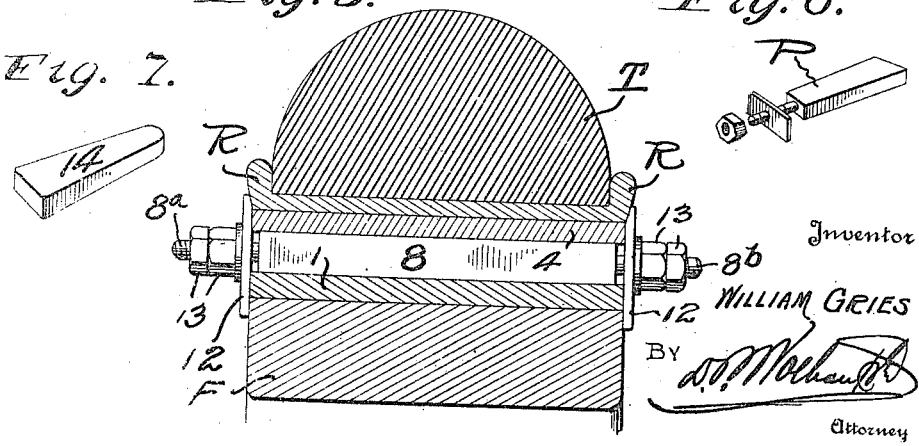
Inventor
WILLIAM GRIES

UNITED STATES PATENT OFFICE.

WILLIAM GRIES, OF NEWARK, NEW JERSEY.

DEMOUNTABLE RIM.

1,261,120. Specification of Letters Patent. Patented Apr. 2, 1918.

Application filed November 24, 1917. Serial No. 203,744.

*To all whom it may concern:*

Be it known that I, WILLIAM GRIES, a citizen of the United States, residing at Newark, in the county of Essex and State of New Jersey, have invented certain new and useful Improvements in Demountable Rims, of which the following is a specification.

This invention relates to demountable rim devices for vehicle wheels, and more particularly to an improvement in the means for locking the resilient tire carrying rim in place on the wheel felly.

While the type of demountable rim, which contacts directly with the wood felly of the wheel, is satisfactory under ordinary conditions and may usually be removed without much effort, it has been found that under conditions where considerable mud and water is encountered that these rims are held on the felly so tightly, by rust, swelling and other factors, that it is frequently impossible to remove the same. In fact, this latter condition has become such an obstacle in the maintenance of truck transport facilities that demountable rims of the type referred to are being discarded for the more primitive clencher type of rim, and the present invention has in view a structure of special utility and practicability for truck wheels and which will entirely obviate the objections to many types of demountable rims as well as the objections to the said clencher type.

Another and very important object of the invention is to provide a structure wherein the tire locking means has a binding or clamping engagement with the inner circumference of the tire carrying rim throughout the entire area of such circumference, thereby providing a frictional engagement between these parts co-extensive with the circumference thereof while at the same time providing a brace support for the tire carrying rim continuously throughout its inner circumference instead of at spaced points of contact as is the case in many forms of construction. Furthermore, the improved locking means is so designed and arranged in connection with its complemental members as to completely close the space between the wheel felly and the tire-carrying rim, to thereby entirely exclude mud and water from the interior surfaces and leave the locking device always in condition to be readily released with the minimum amount of effort.

A further object of the invention is to provide a rim locking structure which will permit the use of the ordinary type of resilient tire carrying rims. In other words, the invention does not contemplate any change in the rim which carries the tire, but only an improvement in the means for locking the usual circular rim to the wheel felly, and with this end in view aims to provide a simple, practical, efficient and reliable construction which may be easily assembled and manipulated in both securing and removing the tire carrying rim from the wheel, and one which is particularly useful with truck wheels.

With the above and other objects in view that will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Fig. 2 is a view similar to Fig. 1 with the shiftable segmental wedge sections of the structure shown in operative holding engagement with the tire carrying rim.

Fig. 3 is a vertical sectional view on the line 3—3 of Fig. 1.

Fig. 6 is a detail perspective view of a filler plug which is adapted to close the adjustment clearance space between the shiftable sections when the same are in binding engagement with the tire carrying rim to prevent dirt etc. from collecting therein.

Fig. 7 shows a type of releasing key that may be utilized in forcing the wedge sections apart in the process of removing the rim from the wheel.

Similar reference characters designate corresponding parts throughout the several figures of the drawings.

Figure 1:
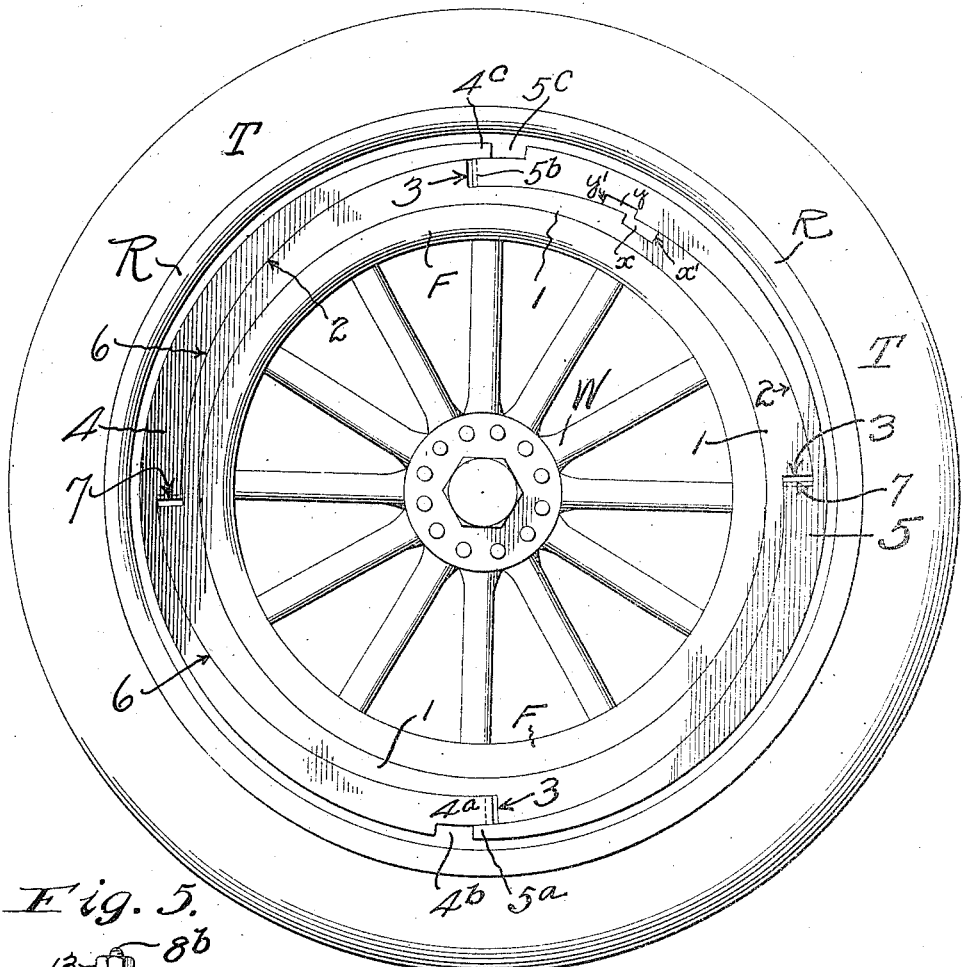
Figure 1 is an elevation of a wheel embodying the present rim locking improvements, the several parts thereof being in contracted position, i. e. out of binding contact with the tire carrying rim.

As previously indicated, the present invention does not in any way propose to alter or change the rim which carries the usual resilient tire, and therefore the drawings show a conventional demountable rim R having fitted thereto a suitable resilient tire T which is adapted to be fixed to the felly F of the wheel W through the medium of the present improved rim-locking structure. This feature of the invention is, therefore, of much practical importance because it makes possible the use of standard rim and tire equipment. It will of course be understood that although the drawing only illustrates a single tire-carrying rim, the invention is equally as useful in connection with the dual tire carrying rims which are frequently employed on heavy trucks.

Referring now more particularly to the improved rim locking structure it will be observed that the same essentially comprises a fixed wedge element carried by the felly of the wheel, a pair of separate segmental rim-engaging wedges whose end portions overlap, and a plurality of transverse locking wedges. From Fig. 1 it will be observed that the said fixed wedge element designated as 1 is in the form of a circular rim or band rigidly fitted to the wheel felly F in any suitable manner such as by a shrinking opration or otherwise and having its outer periphery formed with a plurality of ratchet-like wedge elements 2 which provide a plurality of fixed shoulders 3 at suitable intervals that constitute fixed abutments for the purposes hereinafter indicated. This fixed wedge element 1 is surrounded by a pair of separate and independently shiftable segmental rim-engaging wedges 4 and 5, whose end portions overlap to provide in effect a continuous wedge element for locking the tire-carrying rim in place.

The inner faces of the said wedge sections 4 and 5 are formed with the inclined faces 6 and the shoulders 7 for respectively engaging with the wedge portions 2 of the band 1 and the shoulders 3 of the latter when the sections are out of engagement with the tire carrying rim R. And, as shown in the drawings, one end 4ª of the wedge section 4 may abut against one of the shoulders 3 of the fixed wedge, and is also provided with a clearance recess 4ᵇ for receiving the end 5ª of the shiftable section 5. The opposite end of the section 4, namely 4ᶜ, is adapted to overlap the end 5ᵇ of the section or segment 5 and work in the adjustment clearance space 5ᶜ, while the said end 5ᵇ may initially abut against one of the locking shoulders 3 of the fixed wedge 1 as shown in Fig. 1. Thus, it will be clear that the sections 4 and 5 are duplicates and their ends are so formed that when they are in overlapping engagement ample clearance is provided to permit of their being shifted circumferentially against the inclined portions 2 of the fixed wedge element to engage the rim R.

In order to shift the segmental sections with reference to the fixed wedge element, it is proposed to insert between each of the shoulders 3 of the latter and the similar adjacent portion of the segments a suitable locking key 8 of wedge form. That is to say, it is proposed to insert these locking keys transversely of the felly between the fixed shoulders 3 of the wedge element 1 and the adjacent shoulders 7 and ends 4ª and 5ᵇ of the segmental sections, and, in so doing, the side 9 of the key will engage with the straight side of the shoulder 3, while the opposite side edge 10 thereof which is tapered will engage with a similarly tapered face 11 on the shoulder or abutment of the segmental sections. Thus, it will be clear that when the transverse tapered locking keys are inserted between the fixed shoulders 3 and the corresponding shoulders or abutments of the separate wedge sections, the latter will be forced from the position shown in Fig. 1 to the position shown in Fig. 2, whereby the outer periphery thereof will be uniformly forced and pressed into binding engagement with the tire carrying rim R, throughout its entire inner circumference.

Figure 5:
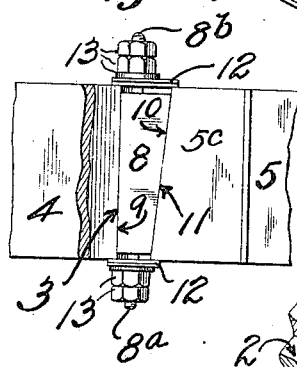
Fig. 5 is a detail sectional view on the line 5—5 of Fig. 2 showing more clearly how the transverse locking key-wedges engage the rigid shoulder of the fixed wedge element and the tapered end portions of the shiftable sections.
Figure 4:
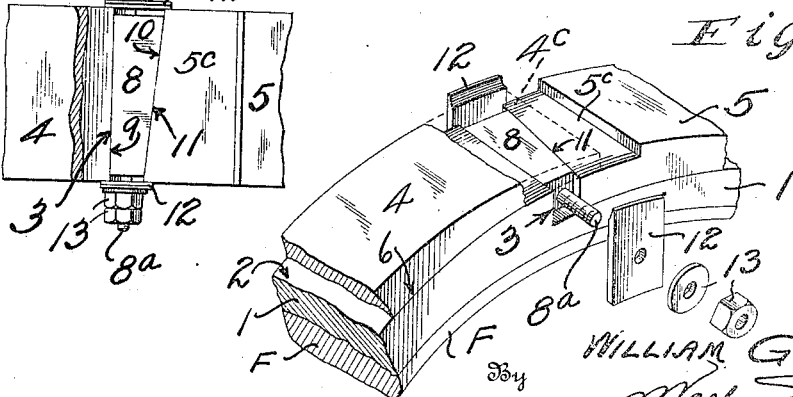
Fig. 4 is a detail perspective view of a portion of the fixed wedge felly-rim and the ends of the shiftable sections showing the relation of the latter to the transverse locking key-wedges.

With further reference to the locking keys 8 it will be observed that the same may be provided at each end with a suitable threaded shank portion 8ª and 8ᵇ to receive thereon the holding lugs 12 and suitable holding nuts and washers 13. When the nuts are screwed onto the shank 8ª of the key it will be obvious that the latter will be pulled in such a direction as to force the segmental section into binding engagement with the tire-rim, and owing to the taper of one side of the key and the corresponding edge of the segment, the latter will be locked against lateral separation from the fixed felly carried wedge, so that the tighter the nuts are screwed onto the threaded shank 8ª, the tighter the segments will grip the rim, and also the tighter the segments will be secured to the fixed wedge element 1. While the continuous frictional engagement of the segmental wedges 4 and 5 with the rim R is sufficient to hold the latter on the wheel, the lugs 12 are employed as an additional safeguard for holding the rim in place, and also for more effectually closing the openings at each end of the keys 8. After the transverse keys 8 have been drawn into final position by the screwing of the nuts on the threaded shanks 8ª of each key, the nuts may be placed on the opposite threaded shank 8ᵇ thereof as shown in Fig. 5, thereby holding the lugs 12 in proper relation to the rim and rim engaging means, and also constituting a rigid lock for holding the keys themselves in position.

After all of the transverse locking keys 8 are in position it will be apparent that the adjustment clearance recesses 4ᵇ and 5ᶜ are left open, and in order to prevent the accumulation of dirt therein and also exclude water, the same are filled up or closed by a suitable tapered filler plug P shown in Fig. 6 of the drawings. These plugs must of course be removed in order to shift the sections 4 and 5 reversely to effect their disengagement with the rim, but as will presently appear one of these plugs may be utilized to assist in this removal action.

When it is desired to release the segments 4 and 5 from binding engagement with the rim R to remove the same from the wheel, it will be apparent that this operation may be greatly facilitated through the nuts 13 and the threaded members 8ᵇ at the wide end of the keys 8. That is to say, when the nuts on the threaded members 8ª of the keys are removed, by screwing the nuts farther onto the opposite threaded member 8ᵇ, the lugs 12 will act as a fulcrum to pull the keys out of contact with the shoulders 3 and tapered end portions of the abutments of the segmental sections. Then, in order to facilitate the shifting of the keys which are likely to be stuck, a suitable tapered releasing key 14 shown in Fig. 7 may be inserted in the key opening 15 formed between one of the inclined portions of the fixed wedge 1 and the opposing portion of the segment 5.

As shown in Fig. 1, this opening is provided by the offset notches $x$ and $y$ respectively formed in the members above referred to and arranged out of register before the segments are driven into locking engagement with the rim. These notches are also arranged so that when the segments are in gripping relation to the rim they will again be out of complete registry but in the opposite direction, thus providing a fixed shoulder $x'$ on the member 1 and an opposing shoulder $y'$ on the section 5 for the releasing key to work against, whereby when the key is forced into the opening by a hammer blow or the like the shoulder $x'$ of the notch $x$ being stationary, will cause the key 14 to exert considerable pressure on the shoulder $y'$ of the section 5 to force the same in a direction opposite to that caused by the tightening up of the locking keys 8. It will of course be understood that when this key 14 is inserted in the opening 15 all of the transverse locking keys 8 are removed as well as the plug P farthest from the said opening, the one nearest the opening however being retained for the purpose of imparting the same movement to the segment 4 as is imparted to the segment 5 by the driving of the releasing key 14 in the opening 15 as above explained. Thus the plug P which is left in place constitutes a coupling between the shoulder of the recess 5ᶜ in the end of the segment 5 and the end 4ᵉ of the segment 4.

From the foregoing it will be apparent that when the several parts of the rim locking structure are in the position shown in Fig. 1, the diameter of the felly carried parts is somewhat less than the internal diameter of the rim, whereby the latter may be easily placed in position thereon. Then, in order to force the separate segmental wedge sections 4 and 5 into engagement with the rim, the transverse locking keys 8 are inserted between the shoulders 3 of the fixed wedge element and the corresponding shoulders 7—7 and ends 4ª and 5ᵇ of the sections 4 and 5 respectively, and the nuts are placed on the threaded end portions of the keys thereby locking the latter in place and also holding the lugs 12 in position to constitute a safeguard against accidental lateral separation of the parts. Thus it will be clear that the securing of the rim to the wheel may be readily effected by means of the transverse locking keys 8, and for the purpose of keeping the clearance recesses 4ᵇ and 5ᶜ between the ends of the segmental sections free from dirt the filler plugs P may be used.

On the other hand when it is desired to remove the rim, the locking keys 8 may be readily removed in the manner already explained, and the plug P farthest from the opening 15 may also be removed whereby when the releasing key 14 is driven into the said opening 15 the sections 4 and 5 will both be shifted in a reverse direction to that caused by the keys 8 due to the fact that the plug P nearest the opening 15 has been left in place.

Without further description it is thought that the many features and advantages of the invention will be readily apparent, and it will of course be understood that changes in the form, and proportion and minor details of the construction may be resorted to without departing from the spirit of the invention or the scope of the appended claims.

I claim:—

1. A demountable rim structure for vehicle wheels including in combination with a felly and tire-carrying rim, a fixed wedge element carried by the felly, a pair of separate semi-circular shiftable wedge sections arranged between the fixed wedge element and the rim, and adapted to have a binding engagement with the latter throughout its entire circumference and means for shifting the sections circumferentially with reference to the fixed element.

2. A demountable rim structure for vehicle wheels including the combination with the wheel felly and tire carrying rim, of an adjustable circular wedge locking device consisting of a pair of separate semi-circular wedge elements wholly occupying the space between the said felly and said rim, and means for causing the separate wedge elements of said device to have a continuous frictional binding engagement with the entire inner circumference of the tire carrying rim.

3. A demountable rim structure for vehicle wheels including in combination with a felly and tire-carrying rim, a fixed wedge element fitted to the felly, a pair of separate semi-circular overlapping wedge sections arranged between the fixed wedge and the rim, and means adapted to be inserted transversely between said fixed and shiftable wedge members to shift the latter circumferentially with respect to the fixed wedge.

4. A demountable rim structure for vehicle wheels including in combination with a felly and tire-carrying rim, a fixed wedge element having a plurality of wedge faces and intervening shoulders, a pair of separate segmental wedge sections also having inclined faces and shoulders for matching with the corresponding parts of the fixed wedge, and locking keys adapted to be inserted transversely between the adjacent shoulder portions of said fixed wedge element and the sections to shift the latter circumferentially with respect to the former.

5. A demountable rim structure for vehicle wheels including in combination with a felly and tire-carrying rim, a fixed wedge element consisting of a series of inclines and intervening shoulders, a pair of segmental independently shiftable wedge sections having inclined portions and shoulders for matching with similar portions of the fixed wedge, and the said shoulders of the segments being beveled, and locking keys adapted to be inserted between the shouldered portions of said fixed wedge and shiftable wedge sections and having a straight edge portion for engaging with the shoulders of the fixed wedge and a tapered edge portion for engaging with the said beveled shoulders of the shiftable sections.

6. A demountable rim structure for vehicle wheels including in combination with a felly and tire-carrying rim, a fixed wedge element fitted to the felly, and a pair of segmental shiftable wedge sections arranged between the fixed wedge element and the rim and having an overlapping engagement with each other at each end, and means for causing the circumferential shifting of the sections with reference to the fixed wedge.

7. A demountable rim structure for vehicle wheels including in combination with a felly and tire-carrying rim, a fixed element fitted to the felly and having a plurality of separate wedges, a pair of separate and independently adjustable sections arranged between the fixed wedge and the rim and also having a plurality of separate wedges, and means adapted to be inserted between each separate wedge element of the said sections and fixed element to cause the said sections to be shifted circumferentially on the latter.

8. A demountable rim structure for vehicle wheels including in combination with a felly and a tire-carrying rim, a fixed element fitted to the felly and having a plurality of inclined faces and abutments between each pair of faces, a pair of separately shiftable sections having inclined faces and abutments therebetween, and means adapted to be inserted between said abutments, for causing the circumferential shifting of the sections with reference to the member carried by the felly, said means including a tapered body having threaded members at each end thereof for receiving holding nuts.

9. A demountable rim structure for vehicle wheels including in combination with a felly and a tire-carrying rim, a fixed wedge element carried by the felly and having a notch, a pair of segmental wedge sections adapted to be shifted circumferentially on the fixed wedge to have a binding engagement with the tire-carrying rim and also having an over-lapping engagement at each end, and one of said sections having a notch adapted to partly register with the notch on the fixed elements when the segments are in binding engagement with the rim to produce opposite shoulders, whereby a wedge may be driven therebetween to release the sections from binding engagement with the rim.

10. A demountable rim structure for vehicle wheels including in combination with a felly and tire-carrying rim, a fixed wedge element fitted to the felly, a pair of segmental wedge sections each having a recess and receiving the adjacent end of the other section, means for forcing said segmental sections circumferentially with respect to the fixed wedge to cause the same to frictionally engage the tire-carrying rim, and filler plugs adapted to be inserted in the recesses formed at the overlapping ends of the segments.

In testimony whereof I hereunto affix my signature in the presence of two witnesses.

WILLIAM GRIES.

Witnesses:
 HERMAN E. KRAUTTER,
 ERNEST M. TAFNER.